United States Patent
Vivanco et al.

(10) Patent No.: US 9,544,097 B1
(45) Date of Patent: Jan. 10, 2017

(54) SYSTEM AND METHOD FOR RETRANSMISSION OF MBMS DATA FLOW

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 266 days.

(21) Appl. No.: 13/971,435

(22) Filed: Aug. 20, 2013

(51) Int. Cl.
*H04L 1/08* (2006.01)
*H04L 12/18* (2006.01)

(52) U.S. Cl.
CPC .............. *H04L 1/08* (2013.01); *H04L 12/189* (2013.01)

(58) Field of Classification Search
None
See application file for complete search history.

(56) References Cited

U.S. PATENT DOCUMENTS

| 8,289,895 | B2 | 10/2012 | Yu et al. | |
|---|---|---|---|---|
| 2008/0025240 | A1* | 1/2008 | Casaccia | H04L 1/1887 370/312 |
| 2011/0211522 | A1* | 9/2011 | Chung | H04L 1/1822 370/315 |
| 2012/0236776 | A1 | 9/2012 | Zhang et al. | |

* cited by examiner

*Primary Examiner* — Adnan Baig

(57) ABSTRACT

Systems and methods for operating a wireless communication system are provided. An access node can receive a multimedia broadcast multicast services data flow. The data flow can comprise a first data packet and a second data packet where the first data packet comprises a first transmission time and the second data packet comprises a second transmission time. The data flow can be stored in a buffer of the access node. The first data packet can be transmitted from the access node to a wireless device at the first transmission time and the access node can receive a retransmission request to retransmit the first data packet. The access node can determine an anticipated packet retransmission time based on when the access node received the request to retransmit the first data packet. The access node can retransmit the first data packet to the wireless device based on the anticipated packet retransmission time.

17 Claims, 8 Drawing Sheets

SYSTEM AND METHOD FOR RETRANSMISSION OF MBMS DATA FLOW

TECHNICAL BACKGROUND

Multimedia Broadcast and Multicast Services (MBMS) is a point-to-multipoint service in which data is transmitted from a single source to multiple destinations over a communication network in one or more consecutive sessions of finite duration. Data can be transmitted using various MBMS modes. For example, in a single cell (SC) MBMS mode, each base station schedules and transmits data independently of all other base stations. In a multimedia broadcast single frequency network (MBSFN) MBMS mode, a group of base stations are synchronized to transmit data at the same time and frequency. Wireless devices can receive multiple versions the data from a plurality of base stations within the group and delays between the different versions can be based on the location of the wireless device relative to the group of base stations. For example, the closer the wireless device is to a base station, the less delay the data will have. The further away the wireless device is from a base station, the greater the delay.

A hybrid automatic repeat request (HARQ) protocol can be used in MBSFN MBMS systems to improve transmission reliability over a wireless communication link. The HARQ protocol can request retransmission of corrupted data packets received at each wireless device. A wireless device in a MBSFN MBMS system, a wireless device can transmit a HARQ retransmission request to the serving base station and the serving base station can generate retransmission to all wireless devices associated with the serving base station. However, after the initial synchronized MBSFN MBMS signal is distributed from the network, no further retransmission is performed at the network level. Rather, each base station individually responds to the retransmission requests preventing multiplexing gain.

OVERVIEW

Systems and methods for operating a wireless communication system are provided. An access node can receive a multimedia broadcast multicast services (MBMS) data flow. The MBMS data flow can comprise a first data packet and a second data packet where the first data packet comprises a first transmission time and the second data packet comprises a second transmission time. The MBMS data flow can be stored in a buffer of the access node. The first data packet can be transmitted from the access node to a wireless device at the first transmission time. The access node can receive from the wireless device a retransmission request to retransmit the first data packet. The access node can determine an anticipated packet retransmission time based on when the access node received the request to retransmit the first data packet. The access node can retransmit the first data packet to the wireless device based on the anticipated packet retransmission time.

Systems and methods for operating another wireless communication system are provided. A controller node can transmit a first multimedia broadcast multicast services (MBMS) data flow to a plurality of access nodes. The MBMS data flow can comprise a first data packet comprising a first transmission time and a second data packet comprising a second transmission time. The controller node can receive a MBMS data flow retransmission request. The MBMS data flow retransmission request can comprise a request to retransmit the first data packet from at least one access node at a data flow retransmission request receipt time. A second MBMS data flow anticipated retransmission time can be determined based on the first transmission time and the MBMS data flow retransmission request receipt time. A group of access nodes from the plurality of access nodes can be determined based on the second MBMS data flow anticipated retransmission time. The controller node can transmit a second MBMS data flow comprising the first data packet having a fourth transmission time to the group of access nodes.

DETAILED DESCRIPTION

Figure 1:
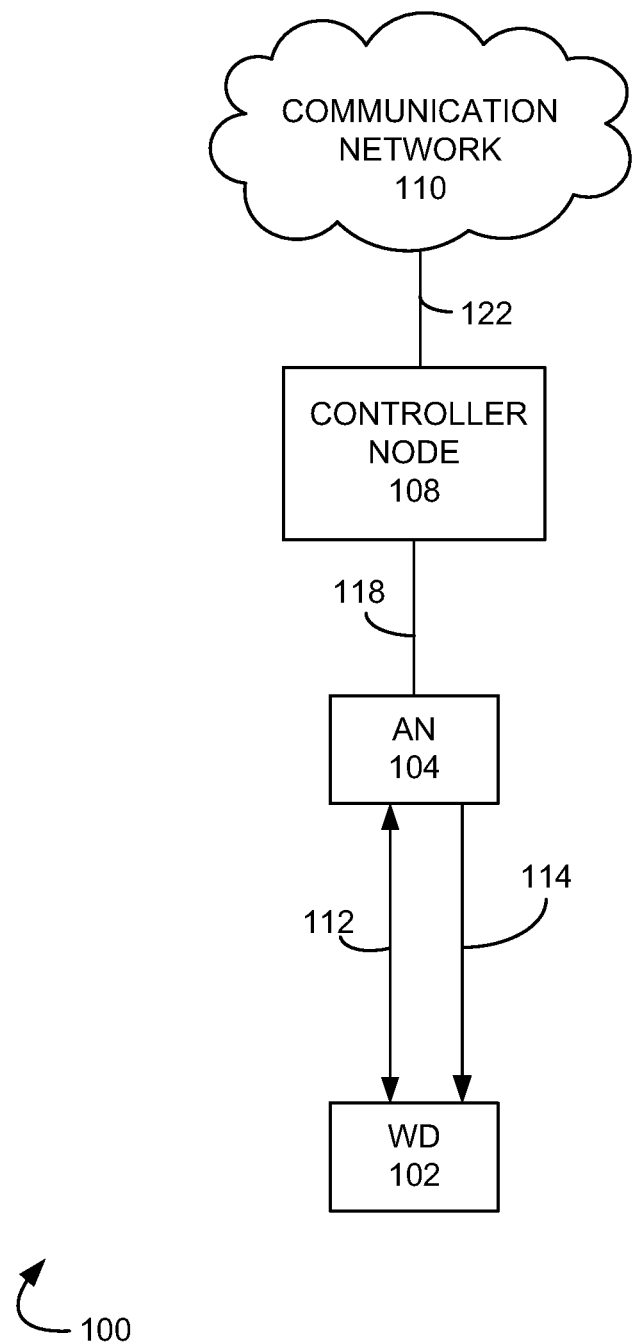
FIG. 1 illustrates an exemplary communication system.

FIG. 1 illustrates an exemplary communication system 100 for providing wireless communications to a wireless device. Communication system 100 can comprise wireless device 102, access node 104, controller node 108, and communication network 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between controller node 108 and communication network 110 which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. Wireless device 102 can be configured to receive a multimedia broadcast multicast services (MBMS) signal. It is noted that while one wireless device is illustrated in FIG. 1 as being in communication with access node 104, any number of wireless devices can be implemented. For example, any number of wireless devices can receive the multicast MBMS signal from an access node.

Wireless device 102 can communicate with access node 104 through communication link 112. Communication link 112 can be a unicast connection established between wireless device 102 and access node 104 such that bi-directional information can be transmitted between the wireless device 102 and access node 104. For example, wireless device 102 can communicate retransmission requests to access node 104 over communication link 112. Access node 104 can be the serving access node for wireless device 102. Communication link 114 can be associated with the MBMS signals such that the links are a multicast unidirectional signals originating at the access node 104 and received by wireless device 102.

Communication links 112, 114 can use various communication media, such as air, space, metal, optical fiber, or some other signal propagation path—including combinations thereof. Communication links 112, 114 can comprise many different signals sharing the same link. Communication links 112, 114 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless links 112, 114, but be transferred over different communication sessions, frequencies, timeslots, packets, ports, sockets, logical transport links—including combinations thereof.

Access node 104 can be any access node configured to communicate with wireless device 102. For example, access node 104 can be selected from a base transceiver station, a radio base station, an eNodeB device, or an enhanced eNodeB device. While not illustrated access node 104 can be in direct communication with each other over a communication link.

Access node 104 can be configured to provide wireless communications to wireless device 102 using various wireless services such as voice, data, video, etc. For example, access node 104 can be configured to transmit data using a multimedia broadcast single frequency network (MBSFN) MBMS mode. MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Controller node 108 can be any network node configured to manage the MBMS services within system 100. For example, controller node 108 can mediate between content providers and network operators such that the controller node 108 formats control plane data and user plane data of the MBMS service where control plane data can be signaling data or control information such as control information associated with network interface or session management and user plane data can be payload data provided to the wireless device 102. The controller node 108 can also authenticate and authorize content providers and/or service providers as well as transmit encrypted data to the communication network 110. Controller node 108 can further provide information about its services for both service announcement and bearer setup purposes, authenticate a wireless device 102 that wishes to join a multicast session, and initiate MBMS session start, modify, and stop signaling. Controller node 108 can provide other control and management functions for system 100. The controller node 108 can be a single device having various functions or a plurality of devices having differing functions. For example, controller node 108 can include at least one of a multi-cell/multicast coordination entity (MCE), a mobility management entity (MME), an e-MBMS gateway, an evolved broadcast multicast service center (e-BM-SC), an authentication, authorization, and accounting (AAA) node, a rights management server (RMS), a subscriber provisioning server (SPS), a policy server, and a combination thereof.

Controller node 108 can comprise a processor and associated circuitry to execute or direct the execution of computer-readable instructions to obtain information. Controller node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 108 can receive instructions and other input at a user interface.

Controller node 108 can be in communication with access node 104 through communication link 118 and communication network 110 through communication link 122. Communication links 118, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 118, 122 can be a direct link or might include various equipment, intermediate components, systems, and networks. Links 118, 122 can include multiple signals operating in a single pathway in a similar manner as wireless links 112, 114.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying data, for example, to support voice and data communications by a wireless device such as wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

In operation, controller node 108 can transmit a first MBMS data flow to access node 104. The first MBMS data flow can comprise a first data packet and a second data packet where the first data packet comprises a first transmission time and the second data packet comprises a second transmission time. Access node 104 can store the first MBMS data flow in a buffer. At the first transmission time, access node 104 can transmit the first data packet to wireless device 102 over communication link 114.

Wireless device 102 can determine whether the first data packet was successfully received. When the first data packet was not successfully received, the wireless device 102 can transmit a retransmission request to access node 104 over communication link 112 where the retransmission request is associated with the unsuccessfully received data packet.

Access node 104 can receive the retransmission request from wireless device 102 and determine whether to retransmit the first data packet or to transmit a MBMS data flow retransmission request based on an anticipated data packet retransmission time. When the access node 104 determines to retransmit the first data packet, access node 104 can retransmit the first data packet to all wireless devices within the service area of the access node 104 (e.g. cell) at a third transmission time where the third transmission time is prior to the second transmission time of the second data packet.

When the access node 104 determines to transmit a MBMS data flow retransmission request, the MBMS data flow retransmission request can be transmitted to the controller node 108. Controller node 108 can determine an anticipated MBMS data flow retransmission time based on a MBMS data flow retransmission request receipt time. Controller node 108 can further determine a group of access nodes in which to transmit a second MBMS data flow comprising the first data packet based on the MBMS data flow retransmission request receipt time. The group of access nodes can include the same number of access nodes that received the first MBMS data flow. Alternatively, the group of access nodes can be less than the number of access nodes that received the first MBMS data flow. The controller node 108 can transmit the second MBMS data flow comprising the first data packet to the determined group of access nodes where the first data packet comprises a fourth transmission time. The fourth transmission time can be prior to the second transmission time of the second data packet.

Figure 2:
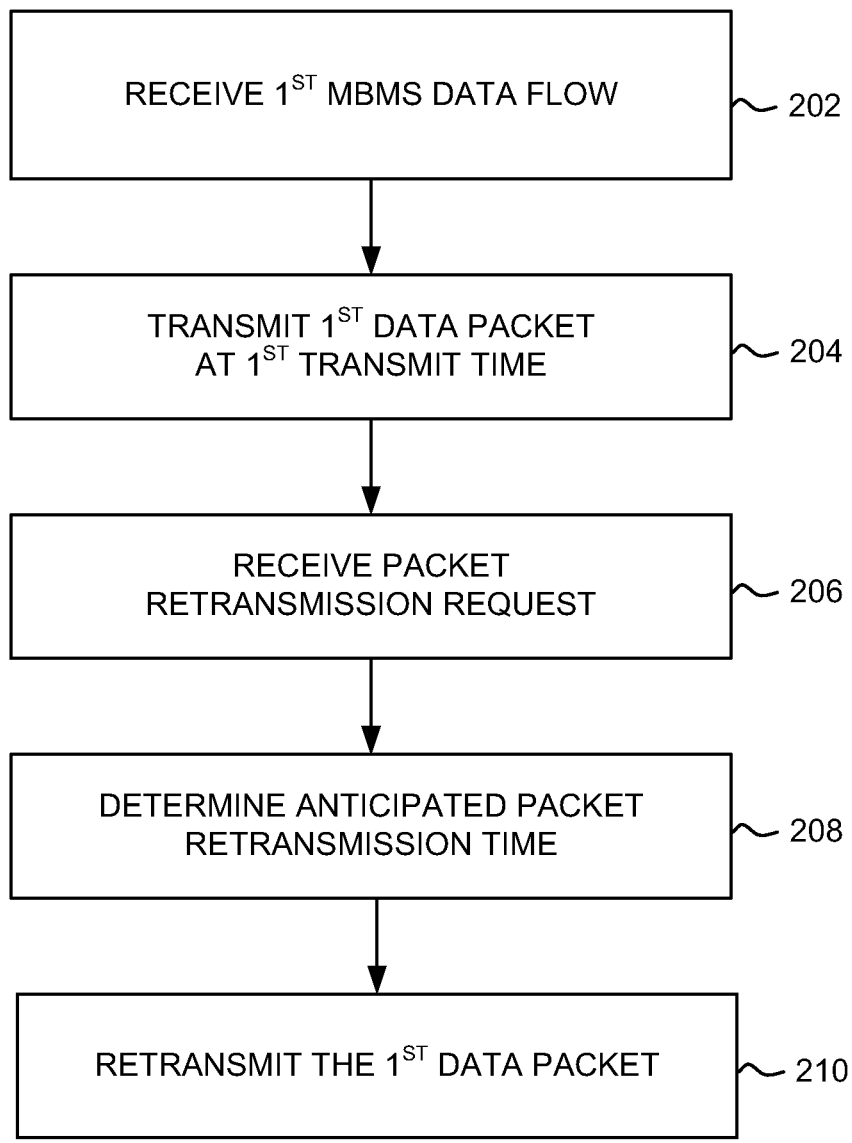
FIG. 2 illustrates an exemplary method of communicating with a wireless device in a wireless communication system.
Figure 3:
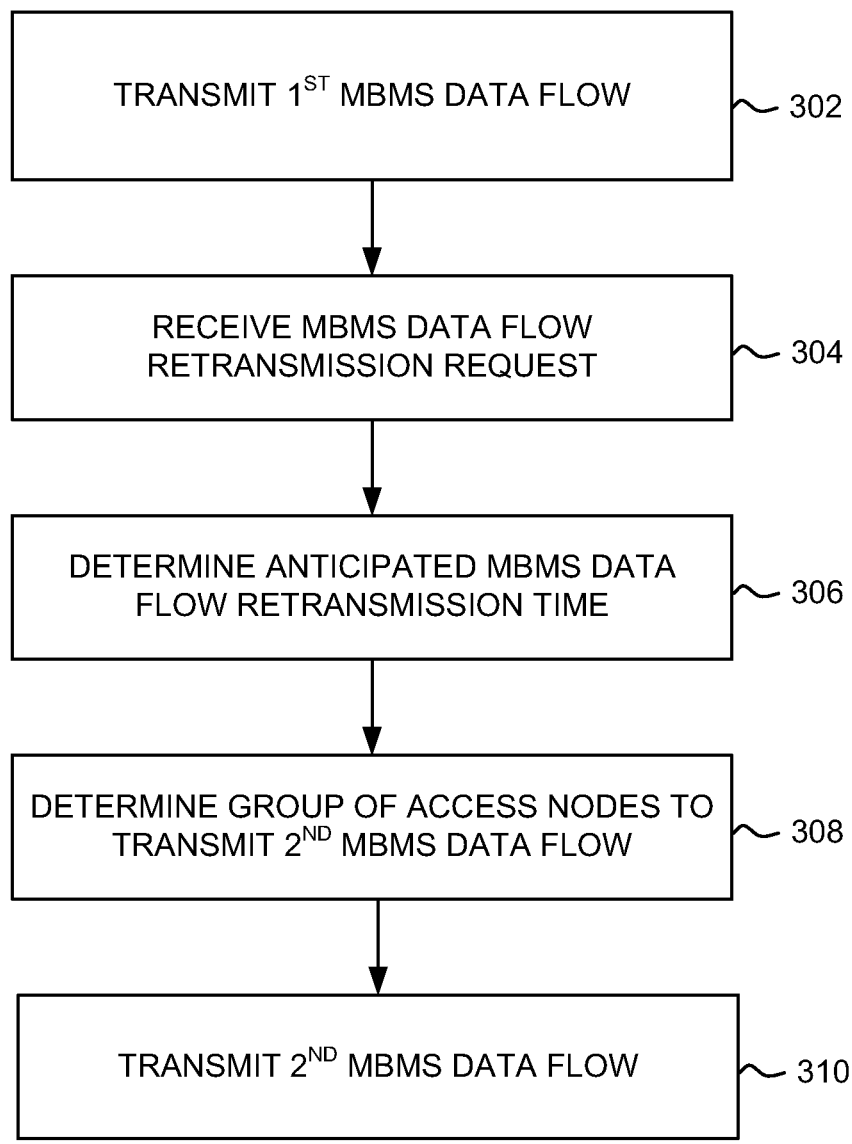
FIG. 3 illustrates another exemplary method of communicating with a wireless device in a wireless communication system.

FIGS. 2 and 3 illustrate flow charts of exemplary methods of communicating with a wireless device in a wireless communication system. The methods will be discussed with reference to the exemplary communication system 100 illustrated in FIG. 1. However, the methods can be implemented with any suitable communication system. In addition, although FIGS. 2 and 3 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 2, a network node can receive a first MBMS data flow at 202. For example, access node 104 can receive the first MBMS data flow comprising a first data packet and a second data packet where the first data packet comprises a first transmission time and the second data packet comprises a second transmission time. The first MBMS data flow can be stored in a buffer of the access node.

A network node can transmit the first data packet of the first MBMS data flow at a first transmission time at 204. For example, access node 104 can transmit the first data packet to wireless device 102 at the first transmission time.

The network node can receive a retransmission request at 206. For example, wireless device 102 can send a packet retransmission request to access node 104 based on whether the first packet was successfully received. The packet retransmission request can be received at the access node 104 at a first retransmission request receipt time.

The network node can determine an anticipated packet retransmission time at 208. For example, access node 104 can determine the anticipated packet retransmission time for the first data packet based on the packet retransmission request receipt time at the access node 104.

At 210, the network node can retransmit the first data packet. For example, access node 104 can retransmit the first data packet to the wireless device 102 based on the anticipated packet retransmission time. The first data packet can be retransmitted to the wireless device at a third transmission time where the third transmission time is prior to the second transmission time of the second data packet.

Referring to FIG. 3, a network node can transmit a MBMS data flow at 302. For example, controller node 108 can transmit a first MBMS data flow comprising a first data packet and a second data packet where the first data packet comprises a first transmission time and the second data packet comprises a second transmission time. The MBMS data flow can be transmitted to access nodes within a first MBMS group. Each access node can store the MBMS data flow in a buffer.

The network node can receive a MBMS data flow retransmission request at 304. For example, access node 104 can transmit the first data packet at the first transmission time. After wireless device 102 determines that the first data packet was not successfully received, the wireless device 102 can transmit a packet retransmission request to access node 104. Access node 104 can then send a MBMS data flow retransmission request to controller node 108.

The network node can determine an anticipated MBMS data flow retransmission time at 306. For example, controller node 108 can determined the anticipated MBMS data flow retransmission time based on when the controller node 108 received the MBMS data flow retransmission request.

A group of access nodes can be determined to transmit a second MBMS data flow comprising the first data packet at 308. For example, controller node 108 can determine the group of access nodes based on the anticipated MBMS data flow retransmission time.

The second MBMS data flow comprising the first data packet can be transmitted to access nodes at 310. For example, controller node 108 can transmit the second MBMS data flow comprising the first data packet to the group of access nodes determined based on the anticipated MBMS data flow retransmission time. The group of access nodes can include the same number of access nodes that received the first MBMS data flow. Alternatively, the group of access nodes that receive the second MBMS data flow can be less than the number of access nodes that received the first MBMS data flow.

Figure 4:
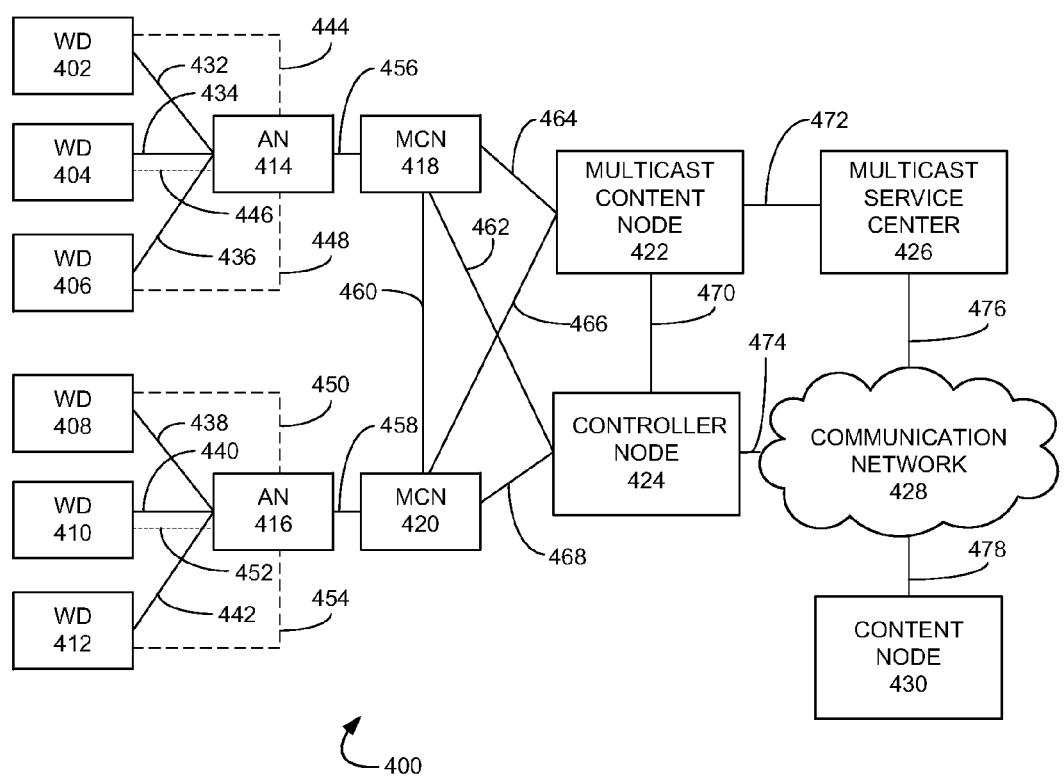
FIG. 4 illustrates another exemplary wireless communication system.

FIG. 4 illustrates an exemplary communication system 400 for providing wireless communications to a wireless device. Communication system 400 can comprise wireless devices 402, 404, 406, 408, 410, 412, access nodes 414, 416, multi-cell/multicast coordination nodes 418, 420, a multicast content node 422, a controller node 424, a multicast service node 426, communication network 428, and content node 430. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication between wireless devices 402, 404, 406, 408, 410, 412 and communication network 428 which are omitted for clarity, including additional processing nodes, routers, gateways, and physical and/or wireless data links for carrying data among the various network elements.

Wireless devices 402, 404, 406, 408, 410, 412 can be any device configured to communicate over communication system 400 using a wireless interface. For example, wireless devices 402, 404, 406, 408, 410, 412 can include a cell phone, a smart phone, a computing platform such as a laptop, palmtop, or a tablet, a personal digital assistant, or an internet access device, and combinations thereof. Wireless devices 402, 404, 406, 408, 410, 412 can be configured to receive a multimedia broadcast multicast services (MBMS) signal. Any number of wireless devices can be associated with access nodes 414, 416 where any number of wireless devices associated with each access node 414, 416 can receive the multicast MBMS signal from the respective access node.

Wireless device 402 can communicate with access node 414 through communication link 432. Wireless device 404 can communicate with access node 414 through communication link 434. Wireless device 406 can communicate with access node 414 through communication link 436. Wireless device 408 can communicate with access node 416 through communication link 438. Wireless device 410 can communicate with access node 416 through communication link 440. Wireless device 412 can communicate with access node 416 through communication link 442. Communication links 432, 434, 436, 438, 440, 442 can be unicast connections established between each wireless device and the respective access node such that bi-directional information can be transmitted between the wireless devices and the access nodes. For example, any retransmission request messages from each wireless device 402, 404, 406, 408, 410, 412 can be transmitted over links 432, 434, 436, 438, 440, 442. Other unicast-type communications can be further transmitted between access nodes 414, 416 and wireless devices 402, 404, 406, 408, 410, 412.

Wireless device 402 can receive MBMS signals from access node 414 over communication link 444. Wireless device 404 can receive MBMS signals from access node 414 over communication link 446. Wireless device 406 can receive MBMS signals from access node 414 over communication link 448. Wireless device 408 can receive MBMS signals from access node 416 over communication link 450. Wireless device 410 can receive MBMS signals from access node 416 over communication link 452. Wireless device 412 can receive MBMS signals from access node 416 over communication link 454. Communication links 444, 446, 448, 450, 452, 454 can be associated with MBMS modes such that multicast unidirectional signals can be transmitted over links from access nodes 414, 416 to the associated wireless devices 402, 404, 406, 408, 410, 412.

Communication links 432, 434, 436, 438, 440, 442, 444, 446, 448, 450, 452, 454 can use various communication media, such as air, space, metal, optical fiber, or some other signal propagation path—including combinations thereof. Communication links 432, 434, 436, 438, 440, 442, 444, 446, 448, 450, 452, 454 can comprise many different signals sharing the same link. Communication links 432, 434, 436, 438, 440, 442, 444, 446, 448, 450, 452, 454 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 402, 404, 406, 408, 410, 412 and access nodes 414, 416 could share the same representative wireless links 432, 434, 436, 438, 440, 442, 444, 446, 448, 450, 452, 454, but be transferred over different communication sessions, frequencies, timeslots, packets, ports, sockets, logical transport links—including combinations thereof.

Access nodes 414, 416 can be any access node configured to communicate with wireless devices 402, 404, 406, 408, 410, 412. For example, access nodes 414, 416 can be selected from a base transceiver station, a radio base station, an eNodeB device, or an enhanced eNodeB device.

Access nodes 414, 416 can be configured to provide wireless communications to wireless devices 402, 404, 406, 408, 410, 412 using various wireless services such as voice, data, video, etc. For example, access nodes 414, 416 can be configured to transmit data using a multimedia broadcast single frequency network (MBSFN) MBMS mode. MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices 402, 404, 406, 408, 410, 412.

Access nodes 414, 416 can comprise a processor and associated circuitry to execute or direct the execution of computer-readable instructions to obtain information. Access nodes 414, 416 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 414, 416 can receive instructions and other input at a user interface.

Multi-cell/multicast coordination nodes (MCNs) 418, 420 can be configured to provide a MBMS control functions between access nodes 414, 416 and the network. For example, MCNs 418, 420 can manage MBMS content and resources. MCNs 418, 420 can allocate time and/or frequency resources to access nodes 414, 416 based on the MBMS mode. MCNs 418, 420 can also determine modulation and coding schemes used in the communication of the data transmissions using MBMS modes. When access nodes 414 and/or 416 transmit data using a MBSFN MBMS mode, MCNs 418, 420 can coordinate the transmission of the synchronized signals from different access nodes. Access nodes 414, 416 can be separate from MCNs 418, 420 or access nodes 414, 416 and MCNs 418, 420 can be integrated within a single node. In addition, MBMS content can be sent to MCNs 418, 420 before transmission from access nodes 414, 416 begins. MCNs 418, 420 can be MBMS gateway nodes.

Multicast content node 422 can be configured to transmit MBMS session content (e.g. user plane data) from the multicast service node 426 to the MCNs 418, 420. When access nodes 414, 416 are configured to transmit in the MBSFN MBMS mode, multicast content node 422 can transmit the MBMS content based on multicast groups. A multicast group can be two or more access nodes identified to transmit a MBMS signal simultaneously over the same channel. The MBMS signals can be synchronized such that the wireless devices associated with the two or more access nodes receive multiple versions of the MBMS content where each version is associated with a differing delay. The delay can be based on the location of the wireless device with respect to each access node within the multicast group. Transmissions from access nodes of the multicast group can be sufficiently synchronized that each signal arrives the wireless devices associated with the multicast group within the cyclic prefix at the start of the symbol such that there is no inter-symbol interference (ISI). Access nodes identified for each multicast group can be neighboring and/or adjacent access nodes such that the multicast group transmits the MBMS content to a service area associated with all identified access nodes.

MCNs 418, 420 can comprise a processor and associated circuitry to execute or direct the execution of computer-readable instructions to obtain information. MCNs 418, 420 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. MCNs 418, 420 can receive instructions and other input at a user interface.

Controller node 424 can be configured to provide control information associated with the MBMS sessions to the MCNs 418, 420. For example, controller node 424 can provide content plane data such as signaling data or control information. Control information can include control information associated with network interface or session management. Controller node 424 can be a mobility management entity (MME).

Controller node 424 can comprise a processor and associated circuitry to execute or direct the execution of computer-readable instructions to obtain information. Controller node 424 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 424 can receive instructions and other input at a user interface.

Multicast service node 426 can be configured to mediate between MBMS content providers and network operators. Multicast service node 426 can be responsible for introducing MBMS content into communication system 400. When a plurality of multicast content nodes 422 are provided within communication system 400, multicast service node 426 can be coupled to all multicast content nodes 422. The multicast service node 426 can be responsible for both control plane data and user plane data of the MBMS service. Authentication and authorization of content providers and/or service providers can also be performed by the multicast service node 426. The multicast service node 426 can receive and modify MBMS content, for instance, by encrypting the MBMS content received from the content node 430 and transmit the encrypted data to the multicast content node 422 and controller node 424 for further transmission to the wireless devices 402, 404, 406, 408, 410, 412. Multicast service node 426 can further provide service information based on services for both service announcement and bearer setup purposes, authenticate wireless devices wishing to join multicast sessions, and initiate an MBMS session start, modify, and stop signaling. The multicast service node 426 can be a broadcast service center (BM-SC). Multicast service node 426 can be a separate node or can be combined with other nodes.

Multicast service node 426 can comprise a processor and associated circuitry to execute or direct the execution of computer-readable instructions to obtain information. Multicast service node 426 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Multicast service node 426 can receive instructions and other input at a user interface.

Communication network 428 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 428 can be capable of carrying data, for example, to support voice and data communications by a wireless device such as wireless devices 402, 404, 406, 408, 410, 412. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 428 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 428 can also comprise additional base stations, controller nodes, telephony switches, internet routers, network gateways, computer systems, communication links, or some other type of communication equipment, and combinations thereof.

Content node 430 can be an MBMS content provider. For example, content node 430 can be an internet protocol (IP) multicast servicer that is coupled to an infrastructure such as a server via a data network. The content node 430 can provide MBMS data in various forms such as IP data packets. The MBMS data can be streaming services such as multimedia, video on demand, webcast. MBMS data can, alternatively or in addition to streaming services, include background services (e.g. warning messages, bulk e-mail, short message services (SMS), downloading, local information, advertisements).

Content node 430 can comprise a processor and associated circuitry to execute or direct the execution of computer-readable instructions to obtain information. Content node 430 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Content node 430 can receive instructions and other input at a user interface.

Access node 414 can be in communication with MCN 418 through communication link 456. Access node 416 can be in communication with MCN 420 through communication link 458. MCN 418 can be in communication with MCN 420 through communication link 460, controller node 424 through communication link 462, and multicast content node 422 through communication link 464. MCN 420 can be in communication with multicast content node 422 through communication link 466 and controller node 424 through communication link 468. Multicast content node 422 can be in communication with controller node 424 through communication link 470 and in communication with multicast service node 426 through communication link 472. Controller node 424 can be in communication with communication network 428 through communication link 474. Communication network 428 can be in further communication with multicast service node 426 through communication link 476 and content node 430 through communication link 478.

Communication links 456, 458, 460, 462, 464, 466, 468, 470, 472, 474, 476, 478 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (Wi-MAX), or Long Term Evolution (LTE), or combinations thereof. Other wireless protocols can also be used. Links 456, 458, 460, 462, 464, 466, 468, 470, 472, 474, 476, 478 can be a direct link or might include various equipment, intermediate components, systems, and networks. Links 456, 458, 460, 462, 464, 466, 468, 470, 472, 474, 476, 478 can include multiple signals operating in a single pathway in a similar manner as wireless links 432, 434, 436, 438, 440, 442, 444, 446, 448, 450, 452, 454.

In operation, multicast service center 426 can receive MBMS content from content node 430 over communication network 428. The multicast service center 426 can format the MBMS content into one or more MBMS data flows comprising data packets. For example, the MBSFN data flow can comprise a first data packet and a second data packet where the first data packet can have a first transmission time ($t_i$) and the second data packet can have a second transmission time ($t_{i+1}$) after the first transmission time. Access nodes 414, 416 can store the first MBMS data flow in a buffer. At the first transmission time ($t_i$), access nodes 414, 416 can simultaneously transmit the first data packet within the respective service area of the access nodes 414, 416. Wireless devices 402, 404, 406, 408, 410, 412 can be configured to receive the first MBMS data flow over communication links 444, 446, 448, 450, 452, 454.

Wireless devices 402, 404, 406, 408, 410, 412 can determine whether the first data packet was received successfully. For example, wireless devices 402, 404, 406, 408, 410, 412 can use a hybrid automatic repeat request (HARM) protocol. When a wireless device determines that the first data packet was successfully received, the wireless device can send an acknowledgment (ACK) message to the serving access node. For instance, when wireless device 402 determines that the first data packet was successfully received wireless device 402 can send the ACK message to access node 414 over communication link 432. When the data packet is not successfully received, the wireless device can send a data packet retransmission request message to the access node. For example, wireless device 402 can send a non-acknowledge (NACK) message to access node 414 over communication link 432. In an alternative exemplary embodiment, wireless device 402 only notifies access node 414 when the data packet is not successfully received and a packet retransmission is needed though a NACK message. Thus, ACK messages are not needed.

The serving access node can receive the data packet retransmission request at a first retransmission request receipt time ($\tau_i$) and determine whether to retransmit the first data packet within the service area (e.g. cell) or to transmit a MBMS data flow retransmission request message to the multicast service center 426. The MBMS data flow retransmission request message can be indicative of a request to retransmit the first data flow within another MBMS data flow that is communication to a group of access nodes within the MBSFN MBMS group. For example, access node 414 can determine whether to retransmit the data packet within the service area of access node 414 or transmit a MBMS data flow retransmission request message based on an anticipated cell retransmission time ($\alpha_1$). The anticipated cell retransmission time ($\alpha_i$) can be indicative of a transmission time associated with retransmitting the first data packet from the access node 414 to all wireless devices within the service area of the access node 402, 404, 406 before the second data packet is scheduled to be simultaneously transmitted from all access nodes within the MBSFN MBMS group at the second transmission time ($t_{i+1}$).

The anticipated cell retransmission time ($\alpha_i$) can be determined based on the second transmit time of the second data packet ($t_{i+1}$) and the first retransmission request receipt time ($\tau_i$) of the data packet retransmission request. For example, the access node 414 can determine a difference between the second transmit time of the second packet and the first retransmission request receipt time ($\Delta_i = t_{i+1} - \tau_i$). The difference between the second transmit time and the first retransmission request receipt time can be compared to a first predetermined threshold ($PT_1$) and a second predetermined threshold ($PT_2$) where the second predetermined threshold is greater than the first predetermined threshold. When the difference between the second transmit time and the first retransmission request receipt time is greater than the first predetermined threshold and less than the second predetermined threshold ($PT_1 < \Delta_i < PT_2$), the access node 414 can determine to retransmit the first data packet at the anticipated cell retransmission time ($\alpha_1$). When the access node 414 determines that the difference between the second transmit time and the first retransmission request receipt time is greater than the second predetermined threshold ($\Delta_i$>$PT_2$), the access node 414 can determine to transmit a MBMS data flow retransmission request message to the controller node 426.

The access node 414 can store the first data packet in a buffer after the first data packet is transmitted to the wireless device 402 at the first transmit time. Thus, when the access node 414 determines to retransmit the first data packet, the access node 414 can retransmit the first data packet from the buffer within the service area of the access node 414 at a third transmission time ($t_{t3}$) where the third transmission time does not interrupt the MBMS synchronization because the third transmission time is before the second data packet is transmitted at the second transmission time.

When the access node 414 determines to transmit the MBMS data flow retransmission request message to the multicast service center 426, the multicast service center 426 can determine a group of access nodes in which to transmit the second MBMS data flow comprising the first data packet based on the MBMS data flow retransmission request. For example, the multicast service center 426 can receive the MBMS data flow retransmission request message at a first MBMS data flow retransmission request receipt time ($\beta_i$). The multicast service center 426 can then determine the difference between the MBMS data flow transmission request receipt time and the second transmit time of the second data packet of the first MBMS data flow ($\Delta_j = t_{i+1} - \beta_i$). The difference between the MBMS data flow transmission request receipt time and the second transmit time of the second data packet can be compared to a third predetermined threshold ($PT_3$) where the third predetermined threshold can be a single value or a range of values. When the difference between the MBMS data flow transmission request receipt time and the second transmit time does not meet the predetermined threshold ($\Delta_j$<$PT_3$), the multicast service center 426 can determine which access nodes within the MBMS group to transmit a second MBMS data flow comprising the first data packet.

Because of the location of some of the access nodes within the MBMS group, the second MBMS data flow may not be received by all access nodes within the MBMS group before second transmission time of the second data packet. The multicast service center 426 can use various factors to determine which access nodes within the MBMS group to transmit the second MBMS group. For example, the multicast service center 426 can consider at least one of an anticipated synchronization overhead for the group of access nodes, a number of active access nodes transmitting the first MBMS data flow, a service requirement of each access node, and a network load. The anticipated synchronization overhead for the group of access nodes can consider the number of overhead messages required to achieve synchronization of the second MBMS data flow within the selected group. When a large number of active access nodes have transmitted a MBMS data flow transmission request receipt to the multicast service center 426, the multicast service center 426 can include all access nodes that transmitted the MBMS data flow transmission request receipt.

The multicast service center 426 can further consider MBMS service requirements of the group when determining which access nodes in which to transmit the second MBMS data flow. MBMS service requirements can include at least one of a traffic type (e.g. guaranteed bit rate and/or non-guaranteed bit rate), a data packet or traffic flow priority, a maximum permitted delay (latency), a minimum throughput, a maximum data loss rate, jitter, and out-of-order delivery. In addition, a determination based on the wireless devices can be considered such as battery power requirements and/or battery levels, etc.

In an embodiment, certain MBMS data flow retransmission requests can be disregarded. For example, if a threshold number of MBMS data flow transmission requests are indicative of an acceptable amount of data packet loss throughout the system, the multicast service center 426 can disregard the MBMS data flow transmission requests and decide not to retransmit the first data packet within a second MBMS data flow. A MBMS data flow retransmission request can also be disregarded when the difference between the MBMS data flow transmission request receipt time and the second transmit time does meets the predetermined threshold.

When the multicast service center 426 determines a group of access nodes to transmit the second MBMS data flow comprising the first data packet, the second MBMS data flow can be transmitted where the first data packet comprises a fourth transmission time ($t_{i4}$). The fourth transmission time of the first data packet can be before the second transmission time of the second packet such that interruption of the transmission of the first MBMS data flow is not interrupted.

Figure 5:
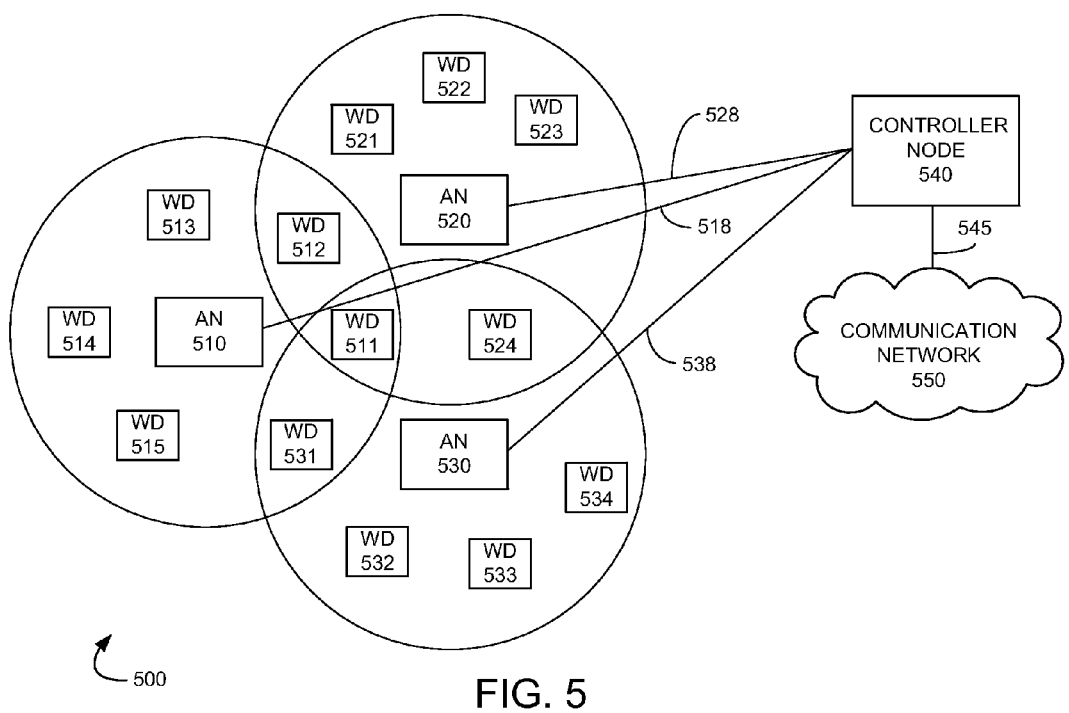
FIG. 5 illustrates another exemplary wireless communication system.

FIG. 5 illustrates another exemplary communication system 500 for providing communication to a wireless device. Communication system 500 can comprise access nodes 510, 520, 530, wireless devices 511, 512, 513, 514, 515, 521, 522, 523, 524, 531, 532, 533, 534, controller node 540, and communication network 550. Other network elements may be present in the communication system 500 to facilitate communication but are omitted for clarity, such as base stations, base station controllers, gateways, mobile switching centers, dispatch application processors, and location registers such as a home location register or visitor location register.

In an exemplary embodiment, wireless devices can receive MBMS data flows from multiple access nodes. For example, wireless devices 511, 512, 513, 514, 515 can establish a unicast-type communication with access node 510 such that bi-directional information can be transmitted between each wireless device 511, 512, 513, 514, 515 and access node 510. Wireless devices 521, 522, 523, 524 can establish a unicast-type communication with access node 520 such that bi-directional information can be transmitted between each wireless device 521, 522, 523, 524 and access node 520. Wireless devices 531, 532, 533, 534 can establish a unicast-type communication with access node 530 such that bi-directional information can be transmitted between each wireless device 531, 532, 533, 534 and access node 530.

In addition, access nodes 510, 520, 530 can transmit MBMS data flows to each wireless device within the associated coverage area of each access node. For example, wireless devices 513, 514, 515 can receive MBMS data flows from access node 510, wireless devices 521, 522, 523 can receive MBMS data flows from access node 520, wireless devices 532, 533, 534 can receive MBMS data flows from access node 530, wireless device 512 can receive MBMS data flows from access nodes 510, 520, wireless device 531 can receive MBMS data flows from access nodes 510, 530, wireless device 524 can receive MBMS data flows from access nodes 520, 530, and wireless device 511 can receive a MBMS data flow from access nodes 510, 520, 530.

In operation, MBMS content can be transmitted to controller node 540 from communication network 550 over link 545. Controller node 540 can format the MBMS content into data flows comprising data packets. For example, the data flows can be MBSFN data flows where each data flow can comprise at least a first data packet and a second data packet where the first data packet can have a first transmission time ($t_i$) and the second data packet can have a second transmission time ($t_{i+1}$) after the first transmission time. Controller node 540 can send the MBSFN data flows to access nodes 510, 520, 530 over communication links 518, 528, 538 where each MBSFN data flow contains substantially the same data.

Access nodes 510, 520, 530 can store the MBSFN data flows in a buffer and at the first transmission time ($t_i$), the access nodes 510, 520, 530 can substantially simultaneously transmit the first data pact. For example, access node 510 can send the first data packet of the MBSFN data flow to wireless devices 511, 512, 513, 514, 515, 531 at substantially the same time that access node 520 can send the first data packet of the MBSFN data flow to wireless devices 521, 522, 523, 524, 511, 512 and at substantially the same time that access node 530 can send the first data packet of the MBSFN data flow to wireless devices 511, 524, 531, 532, 533, 534.

The wireless devices 511, 512, 513, 514, 515, 521, 522, 523, 524, 531, 532, 533, 534 can then determine whether the first data packet was successfully received. For example, each wireless device 511, 512, 513, 514, 515, 521, 522, 523, 524, 531, 532, 533, 534 can use the HARQ protocol to communicate whether the first data packet was successfully received.

When the wireless device determines that the first data packet was successfully received, the wireless device can send an ACK message to the serving access node. For example, if wireless devices 511, 512, 513, 514, 515 determine that the first data packet of the MBSFN data flow was successfully received, wireless devices 511, 512, 513, 514, 515 can send the ACK message to access node 510. If wireless devices 521, 522, 523, 524 determine that the first data packet of the MBSFN data flow was successfully received, wireless devices 521, 522, 523, 524 can send the ACK message to access node 520. If wireless devices 531, 532, 533, 534 determine that the first data packet of the MBSFN data flow was successfully received, wireless devices 531, 532, 533, 534 can send the ACK message to access node 530.

When a wireless device determines that the first data packet is not successfully received, the wireless device can send a data packet retransmission request message to the serving access node. For example, if wireless devices 511, 512, 513, 514, 515 determine that the first data packet of the MBSFN data flow was not successfully received, wireless devices 511, 512, 513, 514, 515 can send the NACK message to access node 510. If wireless devices 521, 522, 523, 524 determine that the first data packet of the MBSFN data flow was not successfully received, wireless devices 521, 522, 523, 524 can send the NACK message to access node 520. If wireless devices 531, 532, 533, 534 determine that the first data packet of the MBSFN data flow was not successfully received, wireless devices 531, 532, 533, 534 can send the NACK message to access node 530

In an embodiment, when a wireless device is receiving data flows from a plurality of access nodes, the HARQ protocol can be used to combine corrupted data packets to achieve one successfully received data packet. For example, wireless device 511 can receive the first data packet from access node 510, access node 520, and access node 530. If one, two, or all three first data packets are corrupted, wireless device 511 can combine the three first data packets in an attempt to produce a first data packet that is not corrupted. If wireless device 511 can create a complete first data packet from the received data packets, wireless device 511 can send an ACK message to access node 510. If wireless device 511 cannot create a complete first data packet from the received first data packets, wireless device 511 can send a NACK message to the access node 510.

After the serving access node receives a data packet retransmission request at a first retransmission request receipt time ($\tau_i$), the serving access node can determine whether to retransmit the first data packet within the coverage area of the access node or to transmit a MBMS data flow retransmission request message to the controller node 540 based on an anticipated cell retransmission time ($\alpha_i$). The anticipated cell retransmission time ($\alpha_i$) can be indicative of a transmission time associated with retransmitting the first data packet from the serving access node to all wireless devices within the service area of the serving access node prior to the scheduled transmission time of a second data packet of the MBMS data flow.

The anticipated cell retransmission time ($\alpha_i$) can be determined based on the second transmit time of the second data packet ($t_{i+1}$) and the first retransmission request receipt time ($\tau_i$) of the data packet retransmission request. For example, the access node 510 can determine a difference between the second transmit time of the second packet and the first retransmission request receipt time ($\Delta_i = t_{i+1} - \tau_i$). The difference between the second transmit time and the first retransmission request receipt time can be compared to a first predetermined threshold ($PT_1$) and a second predetermined threshold ($PT_2$) where the second predetermined threshold is greater than the first predetermined threshold. When the difference between the second transmit time and the first retransmission request receipt time is greater than the first predetermined threshold and less than the second predetermined threshold ($PT_1 < \Delta_i < PT_2$), the access node 510 can determine to retransmit the first data packet at the anticipated cell retransmission time ($\alpha_i$). For example, after receiving a NACK message from wireless device 511, when the anticipated cell retransmission time ($\alpha_i$) meets the criteria, the access node 510 can retransmit the first data packet to wireless devices 511, 512, 513, 514, 515, 531

When the access node 510 determines that the difference between the second transmit time and the first retransmission request receipt time is greater than the second predetermined threshold ($\Delta_i > PT_2$), the access node 510 can determine to transmit a MBMS data flow retransmission request message to the controller node 540.

The MBMS data flow retransmission request message can be indicative of a request to retransmit the first data flow within another MBMS data flow that is communicated to a group of access nodes within the MBSFN MBMS group. For example, controller node 540 can transmit an instruction to access nodes 510, 520, 530 to substantially simultaneously retransmit the first data packet to wireless devices 511, 512, 513, 514, 515, 521, 522, 523, 524, 531, 532, 533, 534.

In an exemplary embodiment, controller node 540 can determine to instruct less than all of the access nodes in a predetermined geographic location. The controller node 540 can determine the difference between the MBMS data flow transmission request receipt time and the second transmit time of the second data packet of the first MBMS data flow ($\Delta_j = t_{i+1} - \beta_i$). The difference between the MBMS data flow transmission request receipt time and the second transmit time of the second data packet can be compared to a third predetermined threshold ($PT_3$) where the third predetermined threshold can be a single value or a range of values. When the difference between the MBMS data flow transmission request receipt time and the second transmit time does not meet the predetermined threshold ($\Delta_j<PT_3$), the controller node 540 can determine which access nodes within the MBMS group to transmit a second MBMS data flow comprising the first data packet. For example, controller node 540 can select access nodes 510, 520 and not access node 530.

Because of the location of some of the access nodes within the MBMS group, the second MBMS data flow may not be received by all access nodes within the MBMS group before second transmission time of the second data packet. The controller node 540 can use various factors to determine which access nodes within the MBMS group to transmit the second MBMS group. For example, the controller node 540 can consider at least one of an anticipated synchronization overhead for the group of access nodes, a number of active access nodes transmitting the first MBMS data flow, a service requirement of each access node, and a network load. The anticipated synchronization overhead for the group of access nodes can consider the number of overhead messages required to achieve synchronization of the second MBMS data flow within the selected group. When a large number of active access nodes have transmitted a MBMS data flow transmission request receipt to the controller node 540, the controller node 540 can include all access nodes that transmitted the MBMS data flow transmission request receipt. For example, when access nodes 510, 520, 530 all send data flow transmission requests to the controller, node 540, controller node 540 can instruct access nodes 510, 520, 530 to retransmit the MBMS data flow.

The controller node 540 can further consider MBMS service requirements of the group when determining which access nodes in which to transmit the second MBMS data flow. MBMS service requirements can include at least one of a traffic type (e.g. guaranteed bit rate and/or non-guaranteed bit rate), a data packet or traffic flow priority, a maximum permitted delay (latency), a minimum throughput, a maximum data loss rate, jitter, and out-of-order delivery. In addition, a determination based on the wireless devices can be considered such as battery power requirements and/or battery levels, etc.

In an embodiment, certain MBMS data flow retransmission requests can be disregarded. For example, if a threshold number of MBMS data flow transmission requests are indicative of an acceptable amount of data packet loss throughout the system, the controller node 540 can disregard the MBMS data flow transmission requests and decide not to retransmit the first data packet within a second MBMS data flow. A MBMS data flow retransmission request can also be disregarded when the difference between the MBMS data flow transmission request receipt time and the second transmit time does meets the predetermined threshold.

When the multicast service center 426 determines a group of access nodes to transmit the second MBMS data flow comprising the first data packet, the second MBMS data flow can be transmitted where the first data packet comprises a fourth transmission time ($t_{i4}$). The fourth transmission time of the first data packet can be before the second transmission time of the second packet such that interruption of the transmission of the first MBMS data flow is not interrupted.

Figure 6:
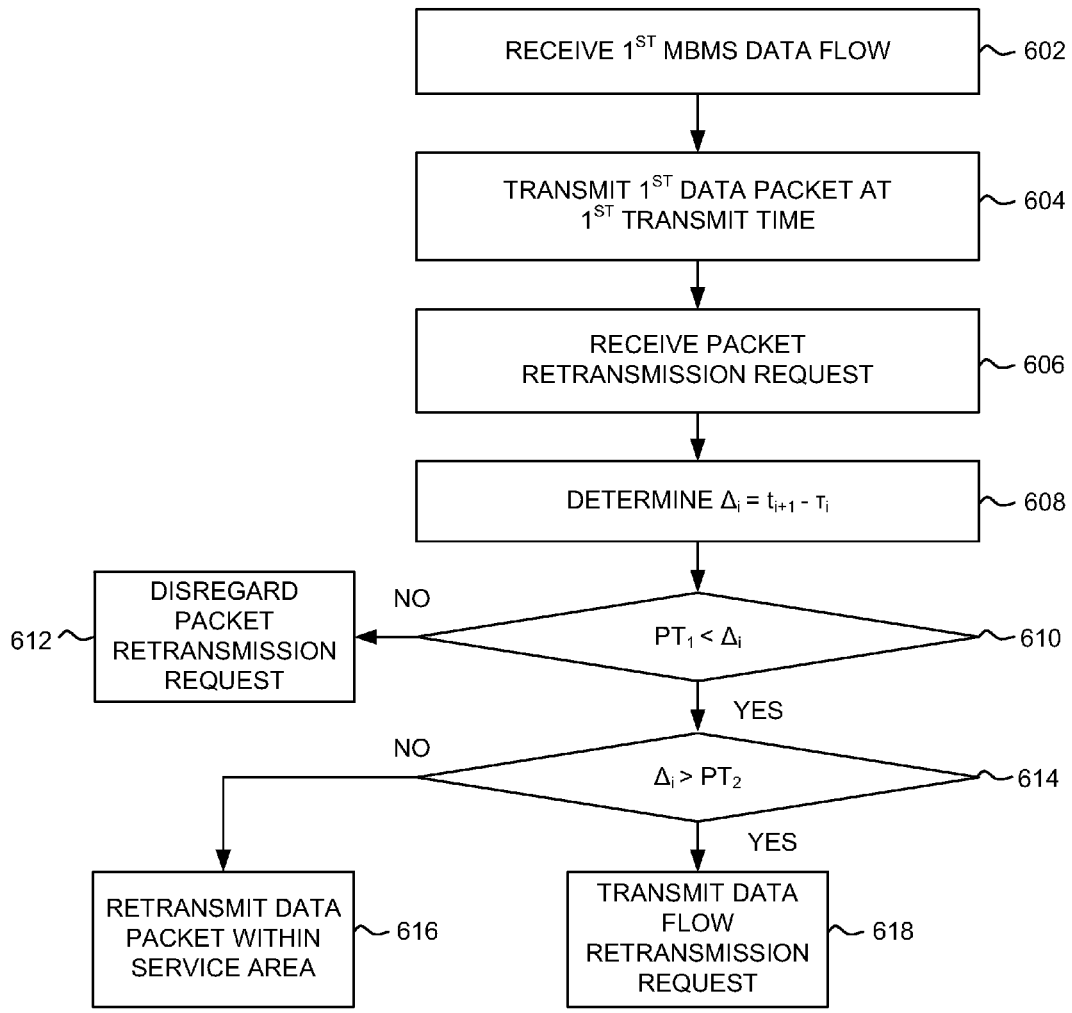
FIG. 6 illustrates another exemplary method of communicating with a wireless device in a wireless communication system.
Figure 7:
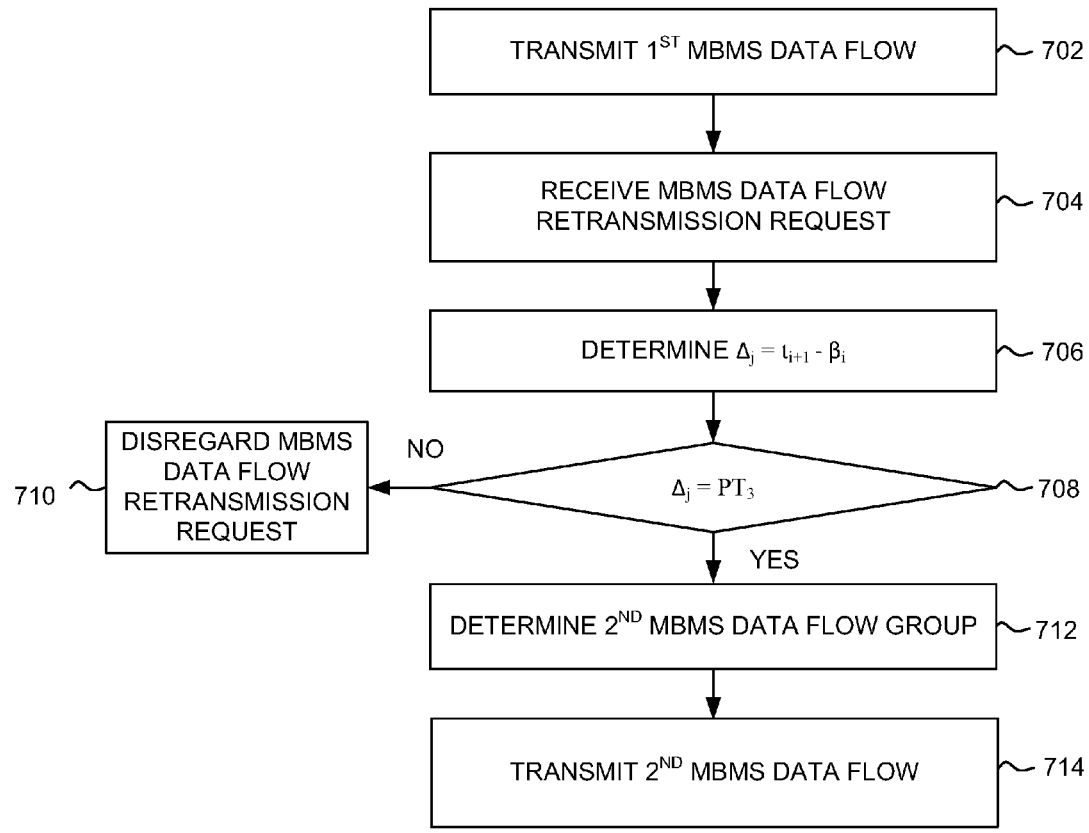
FIG. 7 illustrates another exemplary method of communicating with a wireless device in a wireless communication system.

FIGS. 6 and 7 illustrate flow charts of exemplary methods of communicating with a wireless device in a wireless communication system. The methods will be discussed with reference to the exemplary communication systems 400 and/or 500 illustrated in FIGS. 4 and 5. However, the methods can be implemented with any suitable communication system. In addition, although FIGS. 6 and 7 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 6, a network node can receive a first MBMS data flow at 602. For example, access nodes 414, 416 can belong to an identified MBMS group that receives the first MBMS flow. The first MBMS data flow can be a MBSFN data flow that can be simultaneously transmitted from access nodes 414, 416 at a predetermined time. Alternatively, access nodes 510, 520, 530 can belong to an identified MBMS group that receives the first MBMS flow from controller node 540.

In an embodiment, the first MBMS data flow can comprise a first data packet and a second data packet where the first data packet can comprise a first transmission time and the second data packet can comprise a second transmission time. The MBMS data flow can be sent to the access nodes prior to the first transmission time. For example, access nodes 414, 416, 510, 520, 530 can store the first MBMS data flow in a buffer until transmission.

A network node can transmit the first data packet of the first MBMS data flow at a first transmission time at 604. For example, access nodes 414, 416 can substantially simultaneously transmit the first data packet of a MBSFN data flow at the first transmission time. Alternatively, access nodes 510, 520, 530 can substantially simultaneously transmit the first data packet of a MBSFN data flow at a first transmission time to wireless devices 511, 512, 513, 514, 515, 521, 522, 523, 524, 531, 532, 533, 534. Wireless devices 511, 512, 513, 514, 515, 521, 522, 523, 524, 531, 532, 533, 534 can receive multiple versions of the MBMS data flow with different signal delays based on the location of the wireless device 511, 512, 513, 514, 515, 521, 522, 523, 524, 531, 532, 533, 534 with respect to the access nodes 510, 520, 530. The closer the wireless device is to an access node, the less delay the wireless device can experience in receiving the signal and the greater the delay experienced when the wireless device is located further away from the access node. For example, if wireless devices 513, 514, 515 are closer to access node 510 than wireless device 511, wireless device 511 may receive the MBMS data flow sent by access node 510 after wireless devices 513, 514, 515. In addition, if wireless device 511 is closer to access nodes 520 and/or 530 than access node 510, wireless device 511 may receive the MBMS data flow sent from access nodes 520 and/or 530 before the MBMS data flow sent from access node 510. The multiple MBMS data flow signals received at the wireless device 402, 404, 406, 408, 410, 412 and/or wireless devices 511, 512, 513, 514, 515, 521, 522, 523, 524, 531, 532, 533, 534 can be sufficiently synchronized for each signal to arrive at the wireless device within the cyclic prefix at the start of the symbol to prevent inter-symbol interference (ISI).

Each wireless device can determine whether the first data packet was successfully received. For example, the wireless devices 402, 404, 406, 408, 410, 412 and/or wireless devices 511, 512, 513, 514, 515, 521, 522, 523, 524, 531, 532, 533, 534 can use a HARQ protocol to determine whether the data packet was successfully received. The wireless devices can transmit a response to the access nodes over a unicast communication. When the first data packet was successfully received, the wireless device can send an ACK message to the access node. If the wireless device determines that the first data packet was not successfully received, the wireless device can transmit a packet retransmission request such as a NACK message to the access node. When the wireless device received a corrupted packet, in addition to sending a packet retransmission request the wireless device can store the corrupted data packet in a buffer to be combined with any retransmissions of the data packet. The NACK message can be indicative of a request to retransmit the first data packet.

The network node can receive the packet retransmission request at 606 and determine a difference between the time the access node received the packet retransmission request and the second transmission time of the second packet at 608. For example, access nodes 414 and/or 416 can determine an anticipated cell retransmission time based on the difference between the time the access node received the packet retransmission request and the second transmission time of the second packet.

The network node can compare the difference between the time the access node received the packet retransmission request and the second transmission time of the second packet to a first predetermined threshold at 610. When the difference between the time the access node received the packet retransmission request and the second transmission time of the second packet is less than the first predetermined threshold, the access node can disregard the packet retransmission request at 612. For example, if the access node receives the packet retransmission request shortly before the second data packet is scheduled to be transmitted at the second transmission time and there would not be enough time to retransmit the first data packet before the second transmission time, the access node can disregard the packet retransmission request.

The network node can further compare the difference between the time the access node received the packet retransmission request and the second transmission time of the second packet to a second predetermined threshold at 614. When the difference between the time the access node received the packet retransmission request and the second transmission time of the second packet is less than the second predetermined threshold but greater than the first predetermined threshold, the network node can retransmit the data packet within the service area of the access node at 616. When the difference between the time the access node received the packet retransmission request and the second transmission time of the second packet is greater than the second predetermined threshold, the network node can transmit a data flow retransmission request at 618. For example, if wireless device 511 sends a NACK message to access node 510 and the difference between the time access node 510 received the NACK message and the second transmission time of the second packet is greater than the second predetermined threshold, access node 510 can transmit a data flow retransmission request to the controller node 540 and when the difference between the time the access node received the packet retransmission request and the second transmission time of the second packet would allow the first data packet to be retransmitted throughout the MBMS group of access nodes 510, 520, 530 before the second transmission time of the second packet. When the difference between the time the access node 510 received the packet retransmission request and the second transmission time of the second packet would allow the wireless devices to receive a packet retransmission from the access node but not allow enough time for a second MBMS data flow to be sent from all access nodes in the MBMS group, the access nodes 510, 520, 530 can retransmit the first data packet within the service area of the serving access node that received the packet retransmission request. The first data packet can comprise a third transmission time that is before the second transmission time of the second packet.

Referring to FIG. 7, a network node can transmit a MBMS data flow at 702. For example, multicast service center 426 can transmit a first MBMS data flow comprising a first data packet and a second data packet where the first data packet comprises a first transmission time and the second data packet comprises a second transmission time. The MBMS data flow can be transmitted to access nodes within an identified MBSFN MBMS group such as access nodes 414, 416. Each access node can store the MBMS data flow in a buffer.

The network node can receive a MBMS data flow retransmission request at 704. For example, multicast service center 426 can receive a data flow retransmission request from access nodes 414 and/or 416 based on whether the respective access nodes received a packet retransmission request from a wireless device.

The network node can determined the difference between the MBMS data flow transmission request receipt time and the second transmit time of the second data packet of the first MBMS data flow at 706 and compare the difference to a third predetermined threshold at 708. When the difference between the MBMS data flow transmission request receipt time and the second transmit time of the second data packet of the first MBMS data flow does not meet the third predetermined threshold, the network node can disregard the MBMS data flow retransmission request at 710. For example, when the difference between the MBMS data flow transmission request receipt time and the second transmit time of the second data packet of the first MBMS data flow would not allow for the first data packet to be transmitted prior to the second transmission time of the second packet, the multicast service center 426 can disregard the MBMS data flow retransmission request.

When the difference between the MBMS data flow transmission request receipt time and the second transmit time of the second data packet of the first MBMS data flow meets the third predetermined threshold, the network node can determine a second MBMS data flow group at 712. For example, the determination of the second MBMS data flow group can be based on a location of the access nodes 414, 416. In addition, the multicast service center 426 can use other various factors to determine which access nodes within the MBMS group to transmit the second MBMS group. For example, the multicast service center 426 can consider at least one of an anticipated synchronization overhead for the group of access nodes, a number of active access nodes transmitting the first MBMS data flow, a service requirement of each access node, and a network load. The anticipated synchronization overhead for the group of access nodes can consider the number of overhead messages required to achieve synchronization of the second MBMS data flow within the selected group. When a large number of active access nodes have transmitted a MBMS data flow transmission request receipt to the multicast service center 426, the multicast service center 426 can include all access nodes that transmitted the MBMS data flow transmission request receipt.

The multicast service center 426 can further consider MBMS service requirements of the group when determining which access nodes in which to transmit the second MBMS data flow. MBMS service requirements can include at least one of a traffic type (e.g. guaranteed bit rate and/or non-guaranteed bit rate), a data packet or traffic flow priority, a maximum permitted delay (latency), a minimum throughput, a maximum data loss rate, jitter, and out-of-order delivery. In addition, a determination based on the wireless devices can be considered such as battery power requirements and/or battery levels, etc.

The network node can transmit the second MBMS data flow at 714. For example, the multicast service center 426 can transmit the second MBMS data flow comprising the first data packet to the determined group of access nodes. The first data packet can comprise a fourth transmission time that is before the second transmission time of the second data packet.

Figure 8:
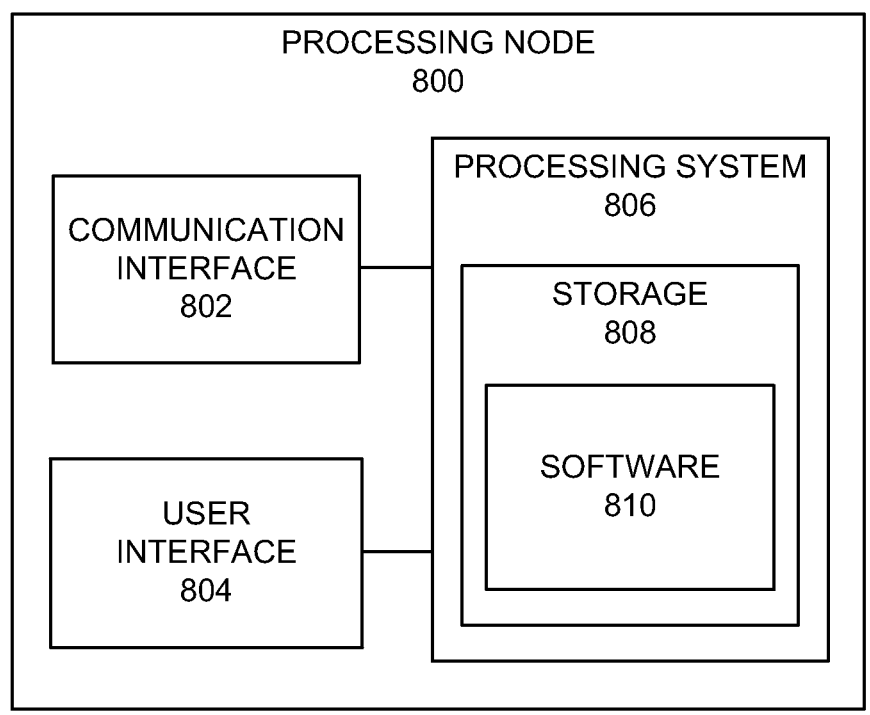
FIG. 8 illustrates an exemplary processing node.

FIG. 8 illustrates an exemplary processing node 8 in a communication system. Processing node 800 comprises communication interface 802, user interface 804, and processing system 806 in communication with communication interface 802 and user interface 804. Processing node 800 is capable of providing wireless communications in a communication network. Processing system 806 includes storage 808, which can comprise a disk drive, flash drive, memory circuitry, or other memory device. Storage 808 can store software 810 which is used in the operation of the processing node 800. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include access nodes 104, 414, 416, 510, 520, 530, controller nodes 108, 424, 540, MCNs 418, 420, multicast content node 422, multicast service center 426, and content node 430. Processing node 800 can also be an adjunct or component of a network element, such as an element of access nodes access nodes 104, 414, 416, 510, 520, 530, controller nodes 108, 424, 540, MCNs 418, 420, multicast content node 422, multicast service center 426, and content node 430. Processing node 800 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   receiving at an access node a first multimedia broadcast multicast services (MBMS) data flow comprising a first data packet and a second data packet, the first data packet comprising a first transmit time and the second data packet comprising a second transmit time;
   transmitting from the access node to a wireless device the first data packet at the first transmit time;
   receiving from the wireless device at the access node a retransmission request at a retransmission request receipt time, wherein the retransmission request comprises a request to retransmit the first data packet;
   determining an anticipated retransmission time based on the second transmit time of the second data packet and the retransmission request receipt time of the retransmission request;
   when the anticipated retransmission time meets a predetermined retransmission time, retransmitting the first data packet from the access node to the wireless device; and
   when the retransmission request receipt time does not meet the predetermined retransmission time, transmitting from the access node to a controller node a MBMS data flow retransmission request to retransmit the first data packet.

2. The method of claim 1, further comprising receiving from the controller node at the access node a second MBMS flow comprising the first data packet.

3. The method of claim 2, wherein the first data packet comprises a third transmit time and the third transmit time is before the second transmit time.

4. The method of claim 1, wherein the first data packet is simultaneously transmitted from a plurality of access nodes at the first transmit time.

5. The method of claim 1, further comprising storing the first MBMS data flow in a buffer of the access node after receiving the first MBMS data flow.

6. The method of claim 5, wherein the first data packet is stored in the buffer of the access node after the first transmit time.

7. A method of operating a wireless communication system comprising:
   transmitting from a controller node a first multimedia broadcast multicast services (MBMS) data flow to a plurality of access nodes, the MBMS data flow comprising a first data packet comprising a first transmission time and a second data packet comprising a second transmission time;
   receiving at the controller node a MBMS data flow retransmission request, wherein the MBMS data flow retransmission request comprises a request to retransmit the first data packet from at least one access node at a data flow retransmission request receipt time, and wherein the MBMS data flow retransmission request is received from the at least one access node when a difference between the second transmission time and the data flow retransmission request receipt time exceeds a predetermined threshold;

determining a second MBMS data flow anticipated retransmission time based on the first transmission time and the MBMS data flow retransmission request receipt time;

determining a group of access nodes from the plurality of access nodes based on the second MBMS data flow anticipated retransmission time; and transmitting from the controller node to the group of access nodes a second MBMS data flow comprising the first data packet having a fourth transmission time.

8. The method of claim 7, wherein the first data packet is simultaneously transmitted from the group of access nodes.

9. The method of claim 7, wherein the group of access nodes is less than the plurality of access nodes configured to transmit the first MBMS data flow.

10. The method of claim 7, wherein determining the group of access nodes from the plurality of access nodes configured to transmit the first MBMS data flow is further based on at least one of an anticipated synchronization overhead of the group of access nodes, a number of active access nodes transmitting the first MBMS data flow, a service requirement of each access node, and a network load.

11. The method of claim 7, wherein the fourth transmission time is based on a maximum transmission latency between the controller node and an access node located furthest away from the controller node.

12. The method of claim 7, wherein the data flow retransmission request receipt time is before the second transmission time.

13. The method of claim 7, wherein the fourth transmission time is before the second transmission time.

14. A wireless communication system comprising:
a processing node configured to
    transmit a first data packet comprising a first transmit time of a first multimedia broadcast multicast services (MBMS) data flow, wherein the first MBMS data flow comprises the first data packet and a second data packet comprising a second transmit time;
    receive a retransmission request at a retransmission request receipt time, wherein the retransmission request comprises a request to retransmit the first data packet;
    determine an anticipated retransmission time based on the first transmit time of the first packet and the retransmission request receipt time; and
    when the anticipated retransmission time meets a predetermined threshold, retransmit the first data packet; and
    when the anticipated retransmission time does not meet the predetermined threshold, transmit to a controller node a MBMS data flow retransmission request to retransmit the first data packet.

15. The system of claim 14, wherein the first data packet is simultaneously transmitted from a plurality of access nodes at the first transmit time.

16. The system of claim 14, wherein the processing node is an access node.

17. The system of claim 16, wherein the access node retransmits the first data packet to a wireless device at a third transmission time such that the third transmission time is before the second transmission time of the second data packet.

* * * * *